Figure 1:
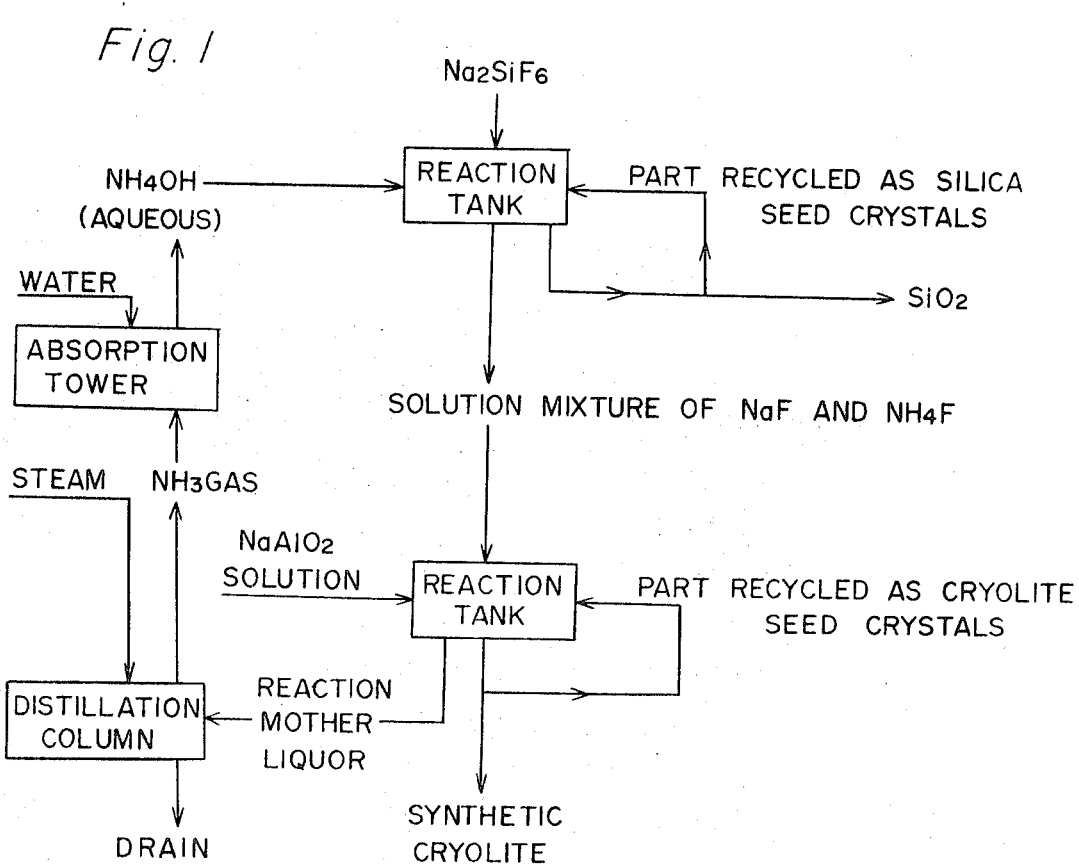

United States Patent
Kadotani et al.

[15] 3,656,894
[45] Apr. 18, 1972

[54] PROCESS FOR THE PRODUCTION OF HIGH QUALITY SYNTHETIC CRYOLITE

[72] Inventors: Makoto Kadotani, Ube; Seishiro Isobe, Yamaguchi, both of Japan

[73] Assignee: Central Glass Co., Ltd., Ube-shi, Yamaguchi-ken, Japan

[22] Filed: May 8, 1970

[21] Appl. No.: 35,719

[52] U.S. Cl. ................................ 23/88, 23/182, 23/193, 23/301
[51] Int. Cl. ....................... C01f 7/54, C01f 7/50, C01d 3/02
[58] Field of Search .......................... 23/88, 182, 301, 193

[56] References Cited

UNITED STATES PATENTS

| | | | |
|---|---|---|---|
| 3,271,107 | 9/1966 | Nickerson et al. | 23/182 R |
| 2,556,064 | 6/1951 | Caldwell et al. | 23/88 |
| 3,462,242 | 8/1969 | Barker et al. | 23/88 |
| 3,055,733 | 9/1962 | Lang et al. | 23/88 |
| 2,492,650 | 12/1949 | McLean et al. | 23/88 |
| 2,853,363 | 9/1958 | Sidun et al. | 23/88 |

FOREIGN PATENTS OR APPLICATIONS

| | | | |
|---|---|---|---|
| 52,775 | 2/1967 | Poland | 23/88 |
| 52,774 | 2/1967 | Poland | 23/88 |

Primary Examiner—Edward Stern
Attorney—Sherman and Shalloway

[57] ABSTRACT

Process for producing high quality synthetic cryolite which comprises mixing a fluoride mixed solution obtained by the ammoniation of sodium silico-fluoride and being free from a filtrable silica with a solution of sodium aluminate of an $Na_2O/Al_2O_3$ molar ratio above 1.0, the 6F/Al ratio in the mixed solution being maintained within the range between 1.0 and 1.2 thereby to adjust the pH of the mixed solution within the range of 8 to 12 without any neutralization procedure, and reacting the mixture at a temperature from 60° C. to the boiling point of the reaction solution in the presence of seeds of cryolite. The synthetic cryolite so obtained contains no chiolite and suffers from very little ignition loss.

6 Claims, 2 Drawing Figures

PROCESS FOR THE PRODUCTION OF HIGH QUALITY SYNTHETIC CRYOLITE

This invention relates to a process for producing synthetic cryolite of high quality. More particularly, the invention relates to a process for producing high quality synthetic cryolite that contains no chiolite and suffers from very little ignition loss, which process involves reacting sodium aluminate with a mixed solution of ammonium and sodium fluoride obtained by the ammoniation of sodium silicofluoride, and without calcination, drying the resulting synthetic cryolite free of moisture adhering thereto.

Fluorite of high quality has been used as the starting material of fluorine for the production of synthetic cryolite in the past. However, with the development of the wet-process phosphoric acid industry in recent years, the recovery of the fluorine, as a by-product, escaping from the phosphoric acid by the wet process and the effective utilization of this fluorine have been considered and there have been numerous proposals for the method of recovering this in the form of sodium silicofluoride.

Further, a method of cryolite synthesis with a solution consisting of ammonium and sodium fluoride obtained by the ammoniation of the recovered sodium silicofluoride, has also been suggested. However, these known manufacturing methods are directed mainly to the prevention of adulteration of synthetic cryolite with, or the elimination of, such impurities as phosphoric acid ($P_2O_5$), silica ($SiO_2$), iron ($Fe_2O_3$) and the sulfate radical ($SO_4$). The object of the present invention is to provide synthetic cryolite whose ignition loss is small and which does not form chiolite by a process of synthesizing cryolite requiring no calcination. There does not exist a process for producing high quality synthetic cryolite that contains no chiolite and suffers from very little ignition loss, by reacting sodium aluminate with a mixed solution of ammonium and sodium fluoride obtained by the ammoniation of sodium silicofluoride, and without calcination, drying the resulting synthetic cryolite free of moisture adhering thereto. Here, the ignition loss and chiolite-containing cryolite will be described.

Cryolite is used principally in electrolytic aluminum reduction cells. Since the cells are of high temperatures (800° to 1,000° C.), the use of a cryolite suffering from a great ignition loss or a cryolite containing chiolite results in an increased loss of the fluorine in the cryolite. This eventually becomes the cause of air pollution. This invented process has been developed in an attempt to prevent this fluorine loss. The synthetic cryolite obtained in accordance with the present invention is thermally stable, has very little ignition loss, and does not contain any chiolite, and this process requires no calcination but merely the drying of the adhered moisture. The ignition loss is so little that it is comparable to that of the natural cryolite. The present invention, as hereinabove noted, provides a process for producing high quality synthetic cryolite and possesses economic significance.

The invention will be more fully described hereinafter. In the synthesis of cryolite with a mixed solution of sodium and ammonium fluoride obtained by the ammoniation of sodium silicofluoride (hereinafter referred to as mixed fluoride solution), we made extensive researches into the major cause of ignition loss (the percent in weight loss resulting from calcination at 800° C. for 1 hour; this definition to be applicable hereinafter) and found that it was due to the influence of such impurities as chiolite ($Na_5Al_3F_{14}$), ammonium sodium cryolite [$Na(NH_4)B2\ AlF_6$], hydrates of ammonium sodium cryolite ($Na\cdot NH_{43}[Al(F\cdot OH)_6]\cdot XH_2O$) and aluminum hydroxide [$Al(OH)_3$], as well as bond water of cryolite ($Na_3AlF_6\cdot XH_2O$), hydroxyl-containing cryolite $Na_3[Al(F\cdot OH)_6]$ and such as ralstonite $Na_3[Al(F\ OH)_6]\cdot XH_2O$ in addition, the volatilization of aluminum fluoride ($AlF_3$). These facts have been made known by X-ray powder diffraction analysis, differential thermal analysis, heat-balance analysis, infrared spectrum analysis and gas chromatography.

Heretofore, for solving the abovementioned defects, i.e. for removing the impurities which became a major cause of ignition loss, as hereinabove noted, the cryolite synthesized with the mixed fluoride solution was calcined at 350° – 700° C. after its synthesis, separation and drying.

Figure 2:
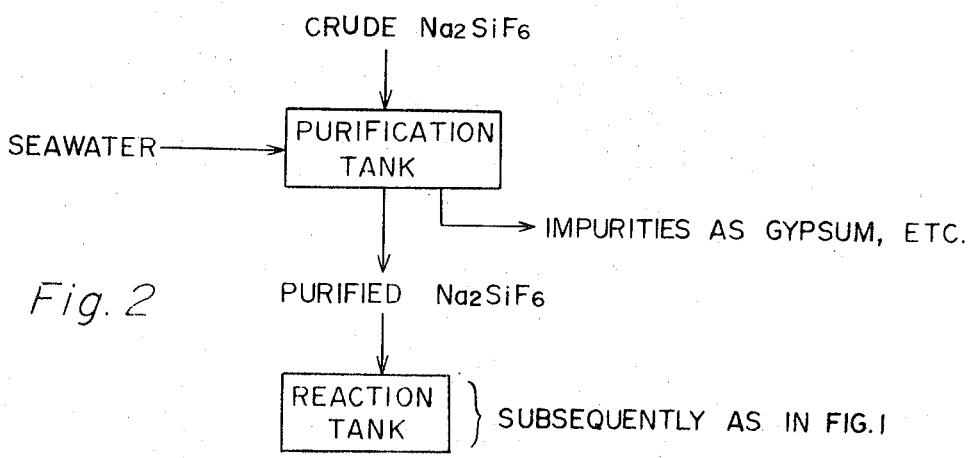

In the accompanying drawings,

FIG. 1 is a flow sheet diagram of one mode of practicing the process of the invention to produce synthetic cryolite from $Na_2SiF_6$; and FIG. 2 is a flow sheet diagram of one mode of practicing the process of the invention of producing synthetic cryolite from $Na_2SiF_6$ after preliminarily purifying crude $Na_2SiF_6$.

We furthered our researches with a view to finding a method of synthesis that would not form the foregoing compounds which were considered to be the major cause of the abovementioned ignition loss. As a result, we found a process wherein by using sodium aluminate, as the aluminum source, in a mole ratio ($Na_2O/Al_2O_3$) over 1.0, and preferably above 1.10; maintaining the equivalent ratio of fluorine to aluminum (6F/Al in the range of 1.0 – 1.2; adjusting the equivalent ratio of fluorine to aluminum (6F/Al) suitably so as to ensure that the pH of the solution during the reaction falls within the range 8 – 12; and by effecting the presence of seed crystals in a sufficient amount relative to the cryolite to be formed (two to 10-fold amount of the synthetic cryolite to be formed) to provide an adequate growth area to ensure that fine crystals are not formed, large cryolite crystals could be formed at a reaction temperature between 60° C. and the boiling point of the solution. By this invention, we could obtain single crystals which contain little, if any, of the abovementioned hydroxyl radical, bond water, etc., and large single crystals (80 – 150 microns) and thermally stable crystal. Furthermore, it was found that cryolite of few ignition loss could be produced by merely drying the synthetic cryolite of its adhered moisture without the necessity of a calcination stop, as is the customary practice.

There is a tendency of the formation of chiolite when the pH of the reaction is on the acid side during the synthesis of cryolite. This tendency increase with a decline in the pH during synthesis. On the other hand, when the pH is on the alkali side, say, above 12, cryolite rich in sodium fluoride tends to form. Cryolite obtained under this condition is also thermally unstable and has the tendency to the volatilitization of aluminum fluoride at the time of heating. Furthermore, the solubility of the cryolite increases with a rise in the pH (the solubility being accelerated above pH 13). Consequently, a decrease in yield is caused. These defects are eliminated in this invention by maintaining the pH in the range 8 – 12. At the same time, by reacting the synthesis at a relatively high temperature of above 60° C., the reaction is accelerated and by reacting the synthesis in the presence of seed crystals, it becomes possible to crystallize the synthetic cryolite as uniform and large size crystals. Thus the formation of hydrates such as $Na_3AlF_6\cdot XH_2O$, $Na_3\ [Al(F\cdot OH)_6]$, $Na_3[Al(F\cdot OH)_6]XH_2O$ and the aluminum hydroxide deriving from sodium aluminate does not result. As a result this synthetic cryolite is exceedingly stable thermally and the ignition loss is little. Volatilization of aluminum fluoride, etc., do not readily occur by being heated at high temperature in the case of this synthetic cryolite. Moreover, this invention uses sodium aluminate as the aluminum source, but, for example, when sulfate such as aluminum sulfate is used, the sulfate radical tends to adulterate the cryolite and bring about a decline in its purity. Aluminum chloride and aluminum nitrate are economically undesirable because of their high cost. In this respect sodium aluminate is inexpensive and as it contains both sodium and aluminum it is convenient in maintaining a suitable equivalent ratio between fluorine, aluminum and sodium.

Thus, a mixed fluoride solution is used as the fluorine source, an equivalent ratio of fluorine to aluminum (6F/Al) of above 1.0 is maintained, and sodium aluminate in a mole ratio ($Na_2O/Al_{23}$) of above 1.0 is used to synthesize the cryolite. As a consequence, at least 3 mols of sodium are always present per each mol of aluminum. Hence, the formation of the hereinbefore noted ammonium cryolites ($NH_4)_3\cdot AlF_6$, Na(NH$_4$)$_2$lF$_6$ and hydrous ammonium cryolites (Na·NH$_4$)$_3$ [Al(F·OH)$_6$]·XH$_2$O are prevented.

When the mole ratio of sodium hydroxide to aluminum hydroxide (Na$_2$O/Al$_2$O$_3$) of the sodium aluminate used in the present invention is maintained at above 1.0, preferably above 1.10, and the manufacturing operation is carried out the reaction at 115° – 120° C., all the aluminum hydroxide is converted to a soluble sodium aluminate salt. Further, all the hydroxides such as iron hydroxide existing in trace amounts in the aluminum hydroxide are converted to soluble salts. In addition, by operating with the foregoing conditions, the formation of aluminum hydroxide which forms as a result of the hydrolysis of sodium aluminate is also prevented and, as a result, the aluminum hydroxide adulteration of the cryolite can be prevented.

In using sodium aluminate, a matter of importance is the fact that alkali is contained in excess in the sodium aluminate. When the proportion of the mixed fluoride solution and sodium aluminate is maintained within the pH range 8 – 12 by a suitable adjustment of the equivalent ratio of fluorine and aluminum (6F/Al) in the range of 1.0 – 1.2 during the synthesis the neutralization, necessary for the conventional methods, is not required and a major portion of the excess sodium originating from sodium aluminate is converted to sodium fluoride. As a result, a very few quantity remains as free sodium hydroxide. Therefore, neutralization is not necessary and adulteration of cryolite with impurities (Na$_2$CO$_3$, Al(OH)$_3$ Al$_2$(OH)$_5$ $_2$ CO$_3$·H$_2$O in the case of neutralization with carbon dioxide, or acid radicals deriving from mineral acids in the case of neutralization with such acids and et ct.) forming in the neutralization can be prevented. When the pH of the reaction is properly maintained, as previously indicated, the cryolite rich in sodium fluoride is prevented and also the formation of thermally unstable cryolite containing aluminum fluoride and etc., is prevented. A decline in yield is also prevented. Further, when the reaction is conducted with the equivalent ratio (6F/Al) ranging 1.0 – 1.2, and preferably 1.02 – 1.2, fluorine is present at all times in the cryolite in excess of theory relative to aluminum, with the consequence that not only is the formation of chiolite checked but also the formation of aluminum hydroxide deriving from sodium aluminate is prevented. Thus, if cryolite is synthesized from a mixed fluoride solution and sodium aluminate by combining these various conditions comprehensively and functionally as hereinbefore described, cryolite containing chiolite, ammonium cryolite, hydroxyl-containing cryolite and bond water or impurities such as thermally unstable cryolite whose aluminum fluoride volatilizes is not separated out. Hence, the resulting cryolite does not have to be submitted to a calcination step—an operation requiring much expense—and thermally stable, pure synthetic cryolite whose ignition loss is exceedingly small can be obtained economically by a simple step of merely drying the adhered moisture.

The step of obtaining the mixed of fluoride solution by the ammoniation of sodium silicofluoride is also of commercial importance with respect to the point of the Filtrability of the resulting silica and the content of dissolved silica in mixed fluoride solution. The silica obtained by the ammoniation of sodium silicofluoride is usually in the form of fine particles having poor filtrability. Moreover, the silica has the tendency to form a gel or sol state. In addition, owing to the fine crystalline form, the degree of supersaturation becomes so great that after the separation, the supersaturation brakes out gradually and this becomes the cause of scaling, etc.

When cryolite is synthesized using this sort of mixed fluoride solution, there is the defect that a high silica content cryolite is formed. As a result of extensive researches with a view to overcoming the foregoing defect, we found that this defect of the prior method could be overcome by operating in the following manner: maintaining in reaction vessel having a capacity corresponding to a residence time of at least 1 hour, preferably at least 2 hours, seeding of solid silica in an amount corresponding to at least a 1-hour's amount, preferably at least a 2-hour's amount of the silica to be formed; using ammonia as ammonia water in an amount of the silica to be formed; using ammonia as ammonia water in an amount of 1.1 – 1.5-fold of theoretical amount required for ammoniation of the sodium silicofluoride (preferably ammonia concentration is not more than 15 percent); and adding continuously to the slurry of sodium silicofluoride, powdery sodium silicofluoride or its mixtures in an amount such that the concentration of the slurry of silica newly formed, becomes not more than 3 percent (percentages here and hereinafter used are on a weight basis). The ammoniation is carried out a room temperature. . Thus, readily filtrable large silica crystal is efficiently formed without the formation of fines, and colloidal or gel form, and the manufacture of a mixed fluoride solution of low content of fine particle silica is made possible. When the amount of the silica seed crystals is less than onefold amount of the silica newly formed, the growth of readily filtrable large silica crystal does not take place easily. Hence, the amount of the silica seed crystals must be an amount at least equal to that of the silica newly formed. If the concentration of the sodium silicofluoride slurry is above 50 percent, the viscosity gets greater, leading to a bad ammoniation and a bad separation of the resulting silica by filtration. Hence, the preferred slurry concentration is 50 percent or less.

When cryolite is synthesized at a reaction temperature above 60° C. using a mixed fluoride solution obtained in this manner at room temperature, the solubility of the silica deriving from the mixed fluoride solution is enhanced in synthesizing solution. Hence, the adulteration of the synthetic cryolite with silica is lessened further. The separated mother liquor obtained after the separation of solids portion of cryolite can be reused in the step of preparing the mixed fluoride solution with the ammoniation of sodium silicofluoride.

As described above precisely, when the synthesis of cryolite is carried out by combining these various conditions comprehensively and functionally, thermally stable pure cryolite whose ignition loss is exceedingly small and not containing any chiolite and its silica content is small, can be obtained economically by the mere drying of its adhered moisture and without the necessity of a calcination step. The silica forming as a by-product in the step of preparing the mixed fluoride solution in this invention, as above mentioned, is obtained as large crystals and its filtrability is exceedingly good. Since its washing effect is very good, silica of high purity containing hardly any impurities such as sodium and ammonium fluoride can be obtained. The silica obtained in this manner has high reactivity. For example, it reacts with caustic soda at room temperature to form sodium silicate, and it can be used in its as-obtained state as starting material for white carbon, etc. From the aspect of the construction material of the equipment, the step of preparing the mixed fluoride solution and the step of synthesizing cryolite, are both carried out under a weak alkaline condition at pH8 – 12, there is no need for such special materials as rubber lining or others as in the case of synthesizing the cryolite under acidic conditions. Hence, the cost of equipment construction can be maintained low.

The invention has been described principally with reference to the process of synthesizing cryolite using as starting material the pure commercial sodium silicofluoride. However, the sodium silicofluoride obtained in the wet process of producing phosphoric acid generally tends to contain such impurities as gypsum and phosphates. Even this sodium silicofluoride of low purity can be used in the present invention as shown in Examples VII and VIII. Namely the sodium silicofluoride is repulped (the term "repulped", as herein used, refers to an operation consisting of rendering the sodium silicofluoride containing impurities such as gypsum, etc., into a slurry with seawater or a hereinafter indicated solution and stirring the so obtained slurry for a prescribed period of time) in either seawater, natural brine or sodium chloride solution (0.5 – 25 percent), or a solution consisting of the foregoing solution to which has been added a small quantity ( 1 – 1,008/l) of a substance which promotes the solubility of the impurities, for example, such as either hydrochloric acid, nitric acid, sulfuric acid, magnesium chloride, magnesium nitrate or ammonium chloride. The so obtained purified sodium silicofluoride is then used as the starting material to synthesize the cryolite by the hereinbefore described process. By operating thus, it becomes possible to produce high purity synthetic cryolite in very good yield and at low cost from low purity sodium silicofluoride, the so obtained cryolite being thermally stable, having an exceedingly low ignition loss, and containing no chiolite and a small amount of such impurities as silica, phosphoric acid constituents and sulfate.

The following examples will be given to illustrate this invention in detail. As a comparison the ignition losses of the natural product and commercially available synthetic cryolite are also shown.

| Temperature (° C.): | Weight loss (percent) |
|---|---|
| 100 | 0 |
| 350 | 0 |
| 500 | 0.20 |
| 600 | 0.35 |
| 700 | 0.41 |
| 800 | 0.47 |
| 900 | 0.59 |

*Measured by a thermobalance with a temperature rise of 5° C. per minute. Percent is cumulative weight loss at the each temperature (applicable likewise hereinafter).

In Table 2 are shown the ignition losses of the natural and commercial synthetic cryolites calcined for 1 hour at 800° C.

TABLE 2

| Experiment | Cryolite used | Ignition loss, percent | Remarks |
|---|---|---|---|
| Control I | Natural cryolite | 1.13 | Results of X-ray powder diffraction analysis indicates presence of $CaF_2$. |
| Control II | Synthetic cryolite (A) | 2.51 | Results of X-ray powder diffraction analysis indicates presence of only $Na_3AlF_6$. |
| Control III | Synthetic cryolite (B) | 2.08 | Results of X-ray powder diffraction analysis indicates presence of containing trace of $Na_5Al_3F_{14}$. |
| Control IV | Synthetic cryolite (C) | 4.89 | Results of X-ray powder diffraction analysis indicates presence of containing considerable $Na_5Al_3F_{14}$. |
| Example I | Invention synthetic cryolite | 0.72 | Results of X-ray powder diffraction analysis indicates presence of only $Na_3AlF_6$. |

EXAMPLE I AND CONTROLS I–IV

A stirrer-equipped 40-liter reaction vessel was continuously charged with a slurry of sodium silicofluoride of 20 percent slurry concentration and ammonia water of 3% $NH_3$ concentration at the rate of 5 kg and 15.4 kg per hour respectively. As the seed crystals, a concentrated silica slurry (slurry concentration 30 percent) obtained in a silica clarification tank was recycled to the system in an amount such that the added silica as solids would be twofold that of the silica to be formed. The reaction was carried out at room temperature. The resulting decomposed slurry was then introduced to a 20-liter silica clarification tank of 30-cm diameter, and the total of the supernatent and the filtrate of concentrated portion was 19.82 kg per hour of a mixed fluoride solution of 3.01% F concentration. The so obtained mixed fluoride solution and 0.898 kg per hour of sodium aluminate of 27% $Al_2O_3$ concentration and mole ratio ($Na_2O/Al_2O_3$) 1.15 (at this, feed ratio 6F/Al = 1.10) were continuously charged to a stirrer-equipped 20-liter reaction vessel. As the seed crystals, a part of the concentrated synthetic cryolite slurry was continuously recycled to the system in an amount of about two fold of the synthetic cryolite to be formed by the foregoing reaction, and the reaction was carried out at a temperature of 90° C. to synthesize the cryolate. The resulting cryolite slurry was then introduced to a cryolite thickening tank, and the concentrated slurry was separated by filtration, washing (0.5 liter $H_2O$ per kg of cryolite) and thereafter dried for 1 hour at 105° C.

The particle size and analytical values of the resulting synthetic cryolite are shown in Table 1, and the adhered moisture of the silica cake (silica separated by filtration) obtained as a result of ammoniation was 38 percent (the value after drying for 3 hours at 500° C.; applicable likewise hereinafter).

TABLE 1 pH of the solution during the synthesis: 10.3
Particle size of synthetic cryolite: 80–150 microns
Analytical values of synthetic cryolite:

| | Percent |
|---|---|
| Ignition loss | 0.72 |
| $SiO_2$ | 0.31 |
| Na | 32.26 |
| Al | 12.61 |
| F | 53.25 |

Results of X-ray powder diffraction analysis: Only $Na_3AlF_6$ present
Results of infrared spectrum analysis: $OH^-$, $H_2O$, $NH_4^+$ not present
Results of heat balance analysis:*

EXAMPLE II

Example I was repeated except that a temperature of 70° C. was used in synthesizing the cryolite. The particle size and analytical values of the resulting synthetic cryolite are shown in Table III.

TABLE 3 pH of the solution during the synthesis: 10.3
Particle size of cryolite: 80–150 microns
Analytical values of cryolite:

| | Percent |
|---|---|
| Ignition loss | 1.03 |
| $SiO_2$ | 0.35 |
| Na | 32.21 |
| Al | 12.51 |
| F | 53.07 |

Results of X-ray power diffraction analysis: Only $Na_3AlF_6$ present
Results of infrared spectrum analysis: $OH^-$, $H_2O$, $NH_4^+$ not present
Results of heat-weight analysis:

| Temperature (° C.): | Weight loss (percent) |
|---|---|
| 100 | 0 |
| 350 | 0 |
| 500 | 0.45 |
| 600 | 0.62 |
| 700 | 0.70 |
| 800 | 0.79 |
| 900 | 0.91 |

EXAMPLE III

A mixed fluoride solution of F concentration of 3.01 percent obtained as in Example I and sodium aluminate of 28.9% $Al_2O_3$ and mole ratio ($Na_2O/Al_2O_3$) 1.05 were continuously charged to a stirrer-equipped 20-liter reaction vessel at the rate of 19.82 and 0.783 kg per hour respectively (at this, feed ratio 6F/Al = 1.18). The reaction was carried out the same as in Example I to synthesize the cryolite and the particle size and analytical values are shown in Table 4.

TABLE 4 pH of the solution during the synthesis: 10.1
Particle size of cryolite: 30–150 microns
Analytical values of cryolite:

| | Percent |
|---|---|
| Ignition loss | 0.69 |
| $SiO_2$ | 0.31 |
| Na | 32.24 |
| Al | 12.63 |
| F | 53.32 |

Results of X-ray powder diffraction analysis: Only $Na_3AlF_6$ present

Results of infrared spectrum analysis: $OH^-$, $H_2O$, $NH_4^+$ not present

Results of heat-balance analysis:

| Temperature (° C.): | Weight loss (percent) |
|---|---|
| 100 | 0 |
| 350 | 0 |
| 500 | 0.20 |
| 600 | 0.36 |
| 700 | 0.41 |
| 800 | 0.46 |
| 900 | 0.58 |

EXAMPLE IV

A mixed fluoride solution of F concentration 3.01 percent obtained as in Example I and sodium aluminate of 26.9% $Al_2O_3$ concentration and mole ratio ($Na_2O/Al_2O_3$) 1.21 were continuously charged to a stirrer-equipped 20-liter reaction vessel at the rates of 19.82 and 0.963 kg per hour (at the feed ratio of 6F/Al = 1.03) respectively. The reaction was carried out the same as in Example I to synthesize the cryolite and the particle size and analytical values are shown in Table 5.

TABLE 5 pH of the solution during the synthesis: 10.8
Particle size of cryolite: 80–150 microns
Analytical values of cryolite:

| | Percent |
|---|---|
| Ignition loss | 0.81 |
| $SiO_2$ | 0.32 |
| Na | 32.35 |
| Al | 12.57 |
| F | 53.19 |

Results of X-ray powder diffraction analysis: Only $Na_3AlF_6$ present

Results of infrared spectrum analysis: $OH^-$, $H_2O$, $NH_4^+$ not present

Results of heat-balance analysis:

| Temperature (° C.): | Weight loss (percent) |
|---|---|
| 100 | 0 |
| 350 | 0 |
| 500 | 0.23 |
| 600 | 0.42 |
| 700 | 0.50 |
| 800 | 0.58 |
| 900 | 0.69 |

EXAMPLE V

A stirrer-equipped 40-liter reaction vessel was continuously charged with powdered sodium silicofluoride, ammonia water of 4.2% $NH_3$ concentration and water in the amounts of 1.0, 11 and 7.7 kg per hour respectively, and the reaction was carried out the same as in Example I and obtained the mixed fluoride solution of 3.12% F concentration. This solution was charged to a stirrer-equipped 20-liter reaction vessel along with sodium aluminate of 27% $Al_2O_3$ concentration and mole ratio ($Na_2O/Al_2O_3$) 1.15 at the rate of 19.13 and 0.898 kg per hour respectively. The reaction was carried out the same as in Example I to obtain a synthetic cryolite and the particle size and analytical values are shown in Table 6. The adhered moisture of the silica cake obtained was 45 percent.

TABLE 6 pH of the solution during the synthesis: 10.3
Particle size of cryolite: 80–150 microns
Analytical values of cryolite:

| | Percent |
|---|---|
| Ignition loss | 0.71 |
| $SiO_2$ | 0.36 |
| Na | 32.25 |
| Al | 12.63 |
| F | 53.29 |

Results of X-ray powder diffraction analysis: Only $Na_3AlF_6$ present

Results of infrared spectrum analysis: $OH^-$, $H_2O$, $NH_4^+$ not present

Results of heat-balance analysis:

| Temperature (° C.): | Weight loss (Percent) |
|---|---|
| 100 | 0 |
| 350 | 0 |
| 500 | 0.19 |
| 600 | 0.34 |
| 700 | 0.42 |
| 800 | 0.48 |
| 900 | 0.60 |

EXAMPLE VI

A stirrer-equipped 40-liter reaction vessel was continuously charged with a slurry of sodium silicofluoride of 40 percent slurry concentration, ammonia water of 15% $NH_3$ concentration and water in the amounts per hour of 2.5, 3.1 and 15.1 kg, respectively. As the silica seed crystals, a thickened silica slurry (slurry concentration 30 percent) obtained in a silica thickening tank was continuously reused to the system in a sevenfold amounts of the silica on a solid base. The reaction which was carried out at room temperature was otherwise carried out as in Example I, to obtain a mixed fluoride solution of 3.21% F concentration. The so obtained mixed fluoride solution and sodium aluminate of 26.9% $Al_2O_3$ concentration, its mole ratio ($Na_2O/Al_2O_3$) 1.25, were continuously charged to a stirrer-equipped 20-liter reaction vessel at the rate of 18.60 and 0.963 kg per hour respectively (at these, feed rate 6F/Al = 1.03). As cryolite seed crystals, the thickened synthetic cryolite obtained in the cryolite thickening tank was reused to the system in a sevenfold amount of the synthetic cryolite formed. The other conditions were the same as in Example I and particle size and analytical values are shown in Table 7.

TABLE 7 pH of the solution during the synthesis: 11.2
Particle size of cryolite: 80–150 microns
Analytical values of cryolite:

| | Percent |
|---|---|
| Ignition loss | 0.73 |
| $SiO_2$ | 0.31 |
| Na | 32.29 |
| Al | 12.63 |
| F | 53.21 |

Results of X-ray powder diffraction analysis: Only $Na_3AlF_6$ present

Results of infrared spectrum analysis: $OH^-$, $H_2O$, $NH_4^+$ not present

Results of heat balance analysis:

| Temperature (° C.): | Weight loss (Percent) |
|---|---|
| 100 | 0 |
| 350 | 0 |
| 500 | 0.23 |
| 600 | 0.37 |
| 700 | 0.45 |
| 800 | 0.53 |
| 900 | 0.61 |

EXAMPLE VII

A stirrer-equipped 20-liter repulping tank was continuously charged with impure sodium silicofluoride 6.67% $SO_4$, 2.79% Ca, 1.24% $P_2O_5$ and 84.8% $Na_2SiF_6$ on a dry base and moisture content 21.29% recovered from a wet process of phosphoric acid, and seawater of 27.34 g/l NaCl concentration, at the rate of 1.58 kg and 47 liters per hour respectively, and repulped at room temperature. Using the sodium silicofluoride obtained by filtration and washing (1 liter of water per kg of $Na_2SiF_6$) cryolite was synthesized as in Example I. The particle size and analytical values of the so obtained synthetic cryolite are shown in Table 8.

TABLE 8 pH of the solution during the synthesis: 10.3
Particle size of cryolite: 80–150 microns
Analytical values of cryolite:

| | Percent |
|---|---|
| Ignition loss | 0.74 |
| $SiO_2$ | 0.31 |
| $P_2O_5$ | 0.021 |
| $SO_4$ | Trace |
| Ca | 0 |
| Na | 32.26 |
| Al | 12.65 |
| F | 53.26 |

Results of X-ray powder diffraction analysis: Only $Na_3AlF_6$ present
Results of infrared spectrum analysis: $OH^-$, $H_2O$, $NH_4^+$ not present
Results of heat-balance analysis:

| Temperature (° C.): | Weight loss (Percent) |
|---|---|
| 100 | 0 |
| 350 | 0 |
| 500 | 0.25 |
| 600 | 0.39 |
| 700 | 0.47 |
| 800 | 0.54 |
| 900 | 0.64 |

EXAMPLE VIII

A stirrer-equipped 20-liter repluping tank was continuously charged with impure sodium silicofluoride 6.67% $SO_4$, 2.79% Ca, 1.24% $P_2O_5$ and 84.8% $Na_2SiF_6$ on a dry base and moisture content 21.29% recovered from a wet process of phosphoric acid, and seawater of 27.34 g/l NaCl concentration, at the rate of 1.58 kg and 47 liters per hour respectively, and repulped at room temperature. The resulting repulped slurry was then introduced into a thickening tank to obtain a sodium silicofluoride slurry of about 30 percent concentration after removal of the supernatant, then the so obtained slurry was introduced into a second repulping tank, where sulfuric acid was continuously added in an amount such that the acid concentration of the slurry would become 0.5 N, and the repulping was carried out at a temperature of 70° C. And we obtained purified sodium silicofluoride by filtration and washing (1 liter of water per 1 kg of sodium silicofluoride). By using the so obtained sodium silicofluoride we synthesized with the same as in Example I and the particle size and analytical values is shown in Table 9.

TABLE 9 pH of the solution during the synthesis: 10.3
Particle size of cryolite: 80–150 microns
Analytical values of cryolite:

| | Percent |
|---|---|
| Ignition loss | 0.76 |
| $SiO_2$ | 0.32 |
| $P_2O_5$ | 0.002 |
| $SO_4$ | Trace |
| Ca | 0 |
| Na | 32.27 |
| Al | 12.68 |
| F | 53.31 |

Results of X-ray powder diffraction analysis: Only $Na_3AlF_6$ present
Results of infrared spectrum analysis: $OH^-$, $H_2O$, $NH_4^+$ not present
Results heat-balance analysis:

| Temperature (° C.): | Weight loss (Percent) |
|---|---|
| 100 | 0 |
| 350 | 0 |
| 500 | 0.26 |
| 600 | 0.43 |
| 700 | 0.49 |
| 800 | 0.54 |
| 900 | 0.62 |

We claim:

1. A process for the synthesis of synthetic cryolite of high purity which comprises mixing sodium aluminate having an $Na_2O/Al_2O_3$ molar ratio greater than 1.10 with a mixed solution containing ammonium fluoride and sodium fluoride obtained by the ammoniation of sodium silicofluoride in a ratio within the range of from 1.02 to 1.2, thereby maintaining the pH of the reaction solution during the synthesis within the range of from 8 to 12, adding to the mixed solution seed cryolite crystals in an amount 2 to 7 times the amount of the resultant synthetic cryolite formed, and maintaining the temperature of the system from 60° C. to the boiling point of the reaction solution.

2. A process for the synthesis of synthetic cryolite of high purity which comprises mixing refined sodium aluminate having an $Na_2O/Al_2O_3$ molar ratio greater than 1.10 with a mixed solution containing ammonium fluoride and sodium fluoride obtained by the ammoniation of purified sodium silicofluoride in a ratio that the equivalent ratio 6F/Al of fluorine to aluminum is within the range of from 1.02 to 1.2, thereby maintaining the pH of the reaction solution during the synthesis within the range of from 8 to 12, said purified sodium silicofluoride being obtained by repulping impure sodium silicofluoride with a solution consisting of at least one member selected from the group consisting of seawater, natural brine and sodium chloride solution, containing a small quantity of a substance which increases the solubility of the impurities contained in said impure sodium silicofluoride, said substance being at least one member selected from the group consisting of hydrochloric acid, nitric acid, sulfuric acid, magnesium chloride, magnesium nitrate and ammonium chloride, adding to the reaction solution seed cryolite crystals in an amount 2 to 7 times the amount of the resultant synthetic cryolite formed, and maintaining the temperature of the system from 60° C. to the boiling point of the reaction solution.

3. The process of claim 1 wherein said mixed solution of ammonium fluoride and sodium fluoride is obtained by continuously adding a slurry of sodium silicofluoride, powdery sodium silicofluoride, or a mixture thereof and 1.1 – 1.5 times the theoretical amount necessary for decomposition of sodium silicofluoride, of ammonia in the form of aqueous ammonia to a reaction vessel containing solid silica as a seed in an amount greater than the amount, of silica formed in a period of 1 hour, and ammoniating sodium silicofluoride at room temperature while maintaining the concentration of the resulting silica slurry below 3 percent by weight.

4. The process of claim 3 wherein the ammonia concentration of said aqueous ammonia is not more than 15 percent by weight.

5. The process of claim 3 wherein the concentration of said sodium silicofluoride slurry is not more than 50 percent by weight.

6. The process of claim 1 wherein said mixed solution of ammonium fluoride and sodium fluoride is obtained by the ammoniation of purified sodium silicofluoride, said purified sodium silicofluoride being obtained by repulping impure sodium silicofluoride with at least one member selected from the group consisting of seawater, natural brine and sodium chloride solution.

* * * * *